(12) United States Patent
DiBenedetto

(10) Patent No.: US 8,381,878 B2
(45) Date of Patent: Feb. 26, 2013

(54) OIL CAPTURE AND BYPASS SYSTEM

(75) Inventor: Enzo DiBenedetto, Torrington, CT (US)

(73) Assignee: United Technologies Corporation, Hartford, CT (US)

( * ) Notice: Subject to any disclaimer, the term of this patent is extended or adjusted under 35 U.S.C. 154(b) by 289 days.

(21) Appl. No.: 12/617,001

(22) Filed: Nov. 12, 2009

(65) Prior Publication Data

US 2011/0108360 A1 May 12, 2011

(51) Int. Cl.
*F01D 25/18* (2006.01)
(52) U.S. Cl. ............................................ 184/6.11
(58) Field of Classification Search ............... 184/6.11, 184/6.12
See application file for complete search history.

(56) References Cited

U.S. PATENT DOCUMENTS

| | | | |
|---|---|---|---|
| 1,334,547 A | 3/1920 | Melcher | |
| 2,984,975 A | 5/1961 | Rodgers et al. | |
| 3,650,353 A | 3/1972 | Abbott | |
| 4,144,950 A * | 3/1979 | Moyer et al. | 184/6.11 |
| 4,153,141 A | 5/1979 | Methlie | |
| 4,309,870 A | 1/1982 | Guest et al. | |
| 4,346,786 A * | 8/1982 | Midgley | 184/6.2 |
| 4,704,862 A * | 11/1987 | Dennison et al. | 60/226.2 |
| 4,781,670 A * | 11/1988 | Kohlstette | 494/27 |
| 4,782,658 A | 11/1988 | Perry | |
| 5,245,820 A * | 9/1993 | Zalewski et al. | 60/39.08 |
| 5,433,674 A | 7/1995 | Sheridan et al. | |
| 5,472,383 A * | 12/1995 | McKibbin | 475/159 |
| 6,223,616 B1 * | 5/2001 | Sheridan | 74/468 |
| 6,793,042 B2 * | 9/2004 | Brouillet | 184/6.11 |
| 7,261,183 B2 * | 8/2007 | Miller | 184/6.12 |
| 7,326,142 B2 | 2/2008 | Asahi et al. | |
| 7,377,098 B2 | 5/2008 | Walker et al. | |
| 7,878,303 B2 * | 2/2011 | Munson | 184/6.11 |
| 8,020,665 B2 * | 9/2011 | Sheridan et al. | 184/6.12 |
| 2008/0116009 A1 | 5/2008 | Sheridan et al. | |
| 2008/0116010 A1 * | 5/2008 | Portlock et al. | 184/6.12 |
| 2009/0123271 A1 * | 5/2009 | Coffin et al. | 415/142 |
| 2009/0151317 A1 * | 6/2009 | Norris et al. | 60/39.162 |
| 2011/0203293 A1 * | 8/2011 | Glahn | 60/785 |

FOREIGN PATENT DOCUMENTS

| | | |
|---|---|---|
| EP | 1925855 A2 | 5/2008 |
| JP | 2004092894 A | 3/2004 |

OTHER PUBLICATIONS

Extended European Search Report of the European Patent Office in corresponding application No. 10251502.0, dated Jul. 11, 2012.

* cited by examiner

*Primary Examiner* — Michael Mansen
*Assistant Examiner* — Mark K Buse
(74) *Attorney, Agent, or Firm* — Kinney & Lange, P.A.

(57) ABSTRACT

An assembly for capturing lubricating liquid from a fan drive gear system of a gas turbine engine includes a gutter and an auxiliary reservoir. The gutter is positioned radially outward from a centerline axis of the gear system for capturing lubricating liquid slung from the gear system. The auxiliary reservoir is fluidically connected to the gutter for receiving and storing the lubricating liquid from the gutter. A portion of the auxiliary reservoir and a portion of the gutter have a same radial distance from the centerline axis of the gear system.

20 Claims, 5 Drawing Sheets

OIL CAPTURE AND BYPASS SYSTEM

CROSS-REFERENCE TO RELATED APPLICATIONS

Reference is made to application Ser. No. 12/470,903 entitled "GRAVITY OPERATED VALVE" filed on May 22, 2009, application Ser. No. 12/470,823 entitled "WINDMILL AND ZERO GRAVITY LUBRICATION SYSTEM" filed on May 22, 2009, and application Ser. No. 12/393,743 entitled "AUXILIARY PUMP SYSTEM FOR FAN DRIVE GEAR SYSTEM", filed on Feb. 26, 2009, all of which are assigned to the same assignee as this application, the disclosures of which are incorporated by reference in their entirety.

BACKGROUND

The present invention relates to a lubrication system, and more particularly, to a lubrication system for a fan drive gear system in gas turbine engines.

In many gas turbine engines, a low pressure spool includes a low pressure turbine connected to and driving a low pressure compressor, and a high pressure spool includes a high pressure turbine connected to and driving a high pressure compressor. A main pump is typically driven by the high pressure spool, connected through gearing, and is used to pump lubricating and cooling liquid to all engine components that require lubrication and cooling.

The main pump typically pumps liquid from a passage connected to a main reservoir that holds both liquid and air. During normal operating conditions, the liquid settles at the bottom of the main reservoir and displaces air to the top. However, in a gas turbine engine mounted on an aircraft, the main reservoir may experience reduced gravitational forces or "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the liquid in the main reservoir can rise to the top, which can expose an opening of the passage to air and interrupt the supply of liquid to the main pump and, consequently, interrupt supply to the engine components. Certain engine components, such as gears and bearings, can be damaged by a relatively short period of non-lubricated operation during negative gravity conditions.

In some gas turbine engines, a fan at the front of the engine is connected to the low pressure spool through a fan drive gear system. When the high pressure spool stops rotating or rotates at a reduced rpm (revolutions per minute), the fan drive gear system can continue rotating even though the main pump will ordinarily provide little or no liquid during this time. For example, wind may rotate the fan and corresponding gears and bearings while the aircraft is parked on the ground or during an in-flight engine shutdown. Certain gears and bearings can also be damaged by a relatively short period of non-lubricated operation during windmilling as well. An auxiliary lubrication system can be used to provide supplemental lubrication to the gears and bearings, however, such a system can take up an undesirable amount of space.

SUMMARY

According to the present invention, an assembly for capturing lubricating liquid from a fan drive gear system of a gas turbine engine includes a gutter and an auxiliary reservoir. The gutter is positioned radially outward from a centerline axis of the gear system for capturing lubricating liquid slung from the gear system. The auxiliary reservoir is fluidically connected to the gutter for receiving and storing the lubricating liquid from the gutter. A portion of the auxiliary reservoir and a portion of the gutter have a same radial distance from the centerline axis of the gear system.

Another embodiment includes a method for capturing lubricating liquid from a fan drive gear system of a gas turbine engine. The method includes catching lubricating liquid slung from the gear system with a gutter spaced circumferentially around the gear system, delivering the lubricating liquid from the gutter to an auxiliary reservoir along a first flow path having turn angles less than or equal to about 60 degrees, and delivering excess lubricating liquid from the auxiliary reservoir to a bypass passage along a second flow path having turn angles less than or equal to about 60 degrees.

DETAILED DESCRIPTION

Figure 1:
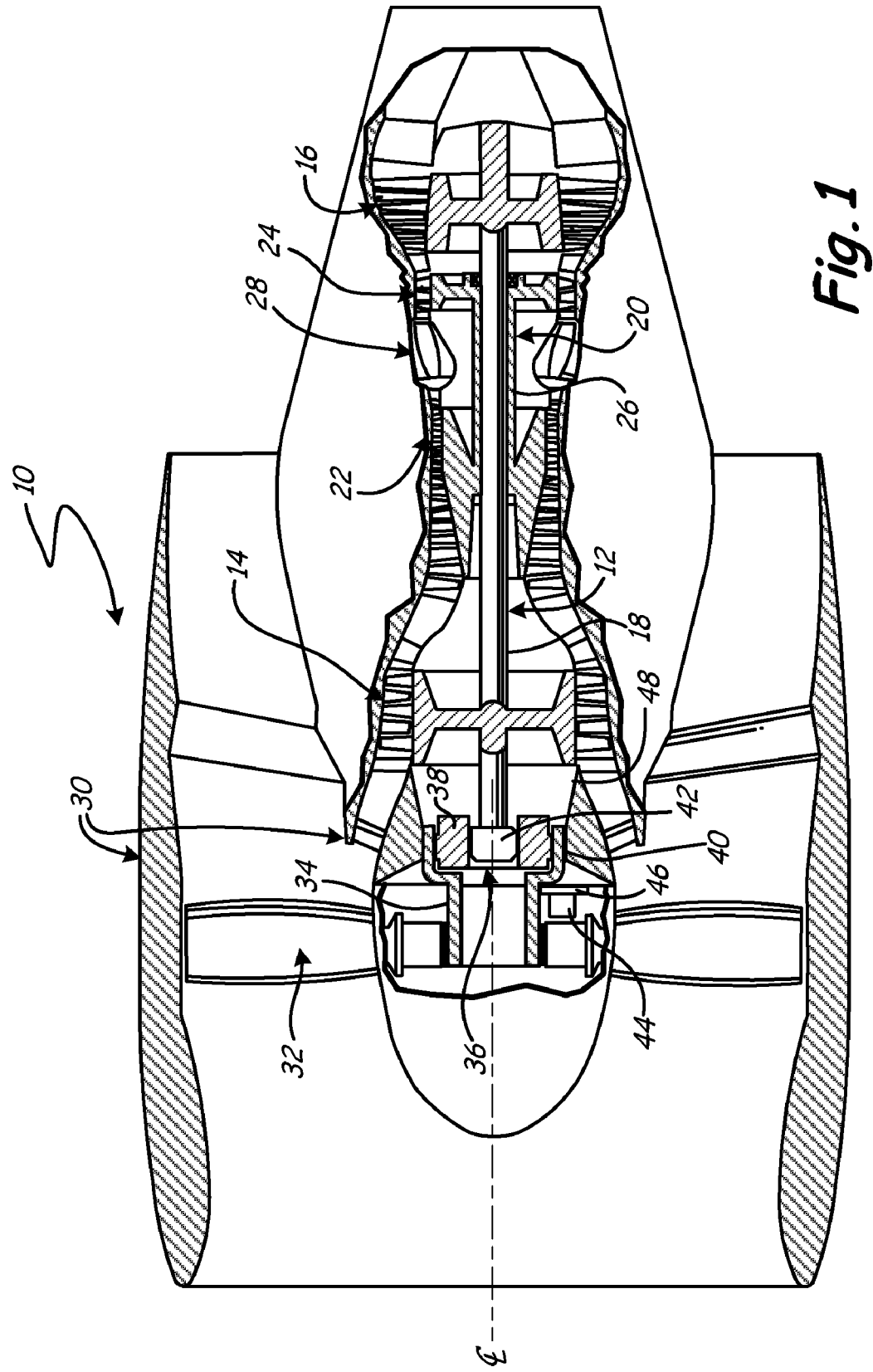
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). Low pressure spool 12, high pressure spool 20, fan shaft 34, and fan drive gear system 36 all rotate substantially around centerline axis $C_L$. The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

Pump 44 is coupled to and is driven by fan shaft 34 via pump gear 46 such that pump 44 can operate whenever fan shaft 34 is rotating. Pump 44 supplies a lubricating liquid, such as oil, to lubricate components such as gears and bearings of fan drive gear system 36. Fan drive gear system 36 benefits from a relatively continuous supply of lubricating liquid whenever fan shaft 34 is rotating. At least some of the lubricating liquid supplied to fan drive gear system 36 drains to sump 48 and is eventually pumped back through pump 44. In an alternative embodiment, pump 44 can be an electrically driven oil pump.

Figure 2:
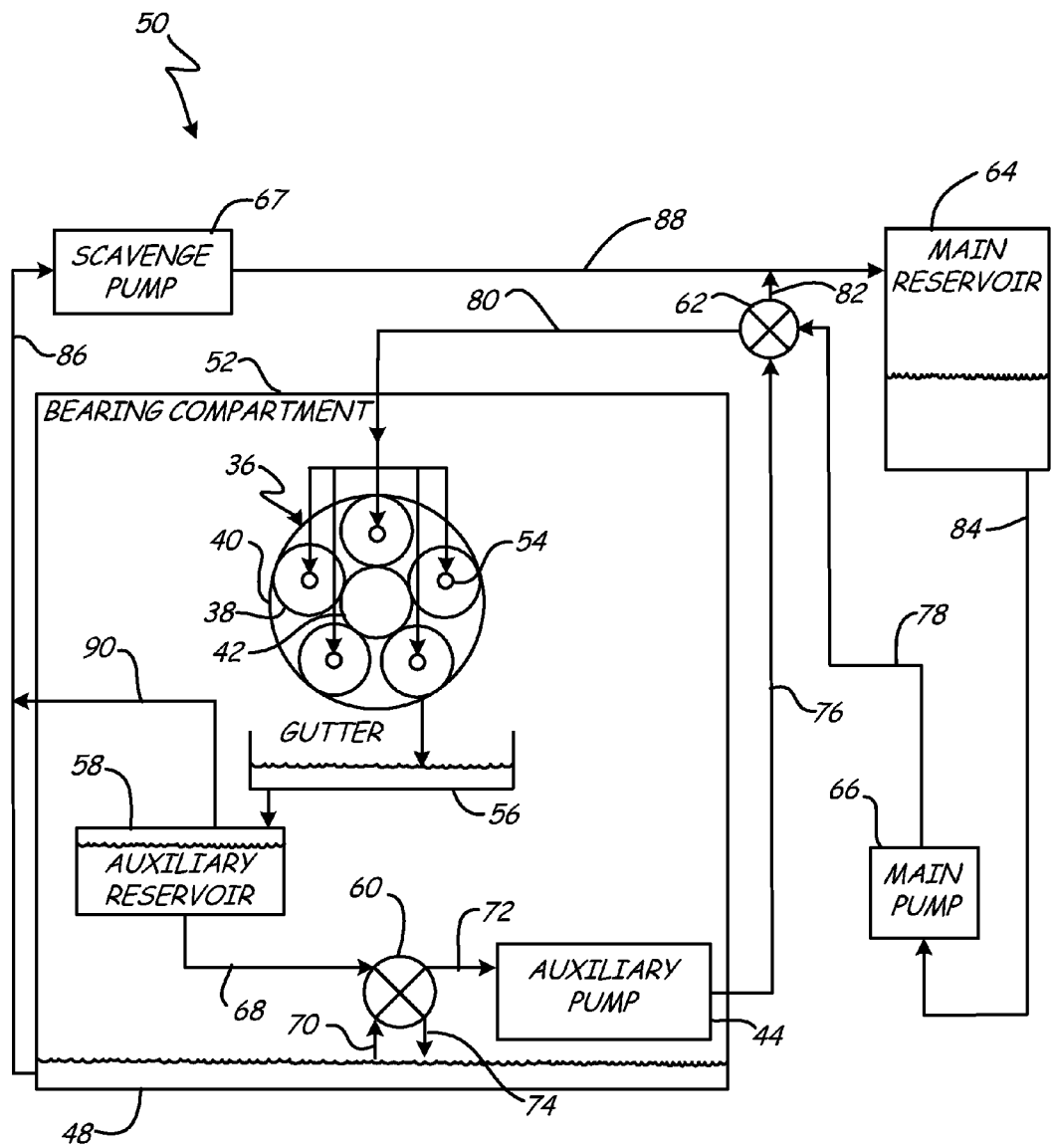
FIG. 2 is a schematic view of a pump system for use in the gas turbine engine of FIG. 1.

FIG. 2 is a schematic view of pump system 50. Pump system 50 includes bearing compartment 52 having a compartment cavity that contains fan drive gear system 36 (including bearings 54), auxiliary pump 44, gutter 56, auxiliary reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, 88, and 90 connect the various components as illustrated and as further described, below.

As fan drive gear system 36 spins, lubricating liquid drips or is slung off fan drive gear system 36 into bearing compartment 52 in different directions. A portion of that liquid is caught and collected by gutter 56 and funneled to auxiliary reservoir 58. During normal operating conditions, auxiliary reservoir 58 is kept substantially full of liquid for later use. In one embodiment, auxiliary reservoir 58 contains enough liquid to provide adequate lubrication for fan drive gear system 36 for a specified amount of time. Liquid in excess of that required by auxiliary reservoir 58 is delivered through bypass passage 90 to main scavenge passage 86. Gutter 56 does not collect all liquid leaving fan drive gear system 36. The remaining liquid that is not collected by gutter 56 falls to sump 48, which is an open-top reservoir at a bottom of bearing compartment 52. Bearing compartment 52 can be sealed to reduce liquid flow out of bearing compartment 52, except through designated passages as herein described.

Second shuttle valve 62 is fluidically connected to auxiliary pump 44 via passage 76, to main pump 66 via passage 78, to bearings 54 via passage 80, and to main reservoir 64 via passages 82 and 88. Second shuttle valve 62 selectively directs fluid flow from auxiliary pump 44 or main pump 66 to bearings 54. Main reservoir 64 is further connected to main pump 66 through passage 84. Scavenge pump 67 is connected to sump 48 via main scavenge passage 86 and to main reservoir 64 via passage 88. Scavenge pump 67 pumps a portion of the liquid in sump 48 to main reservoir 64 for use by main pump 66. (See application Ser. No. 12/470,823 entitled "WINDMILL AND ZERO GRAVITY LUBRICATION SYSTEM" filed on May 22, 2009 and assigned to the same assignee as this application for a more detailed description of the function of second shuttle valve 62).

First shuttle valve 60 is fluidically connected to auxiliary reservoir 58 via passage 68, to sump 48 via passage 70, to auxiliary pump 44 via passage 72, and again to sump 48 via passage 74. As part of pump system 50, first shuttle valve 60 and second shuttle valve 62 work together as a valve system. This valve system directs lubricating liquid to bearings 54 from one of sump 48, auxiliary reservoir 58, or main reservoir 64. When engine operating conditions prevent main pump 66 from supplying adequate liquid, second shuttle valve 62 switches from main pump 66 to auxiliary pump 44. Switching to auxiliary pump 44 can be beneficial if it has an adequate supply of liquid from first shuttle valve 60 during all gravity conditions. (See application Ser. No. 12/470,903 entitled "GRAVITY OPERATED VALVE" filed on May 22, 2009 and assigned to the same assignee as this application for a more detailed description of the function of first shuttle valve 60).

Figure 3:
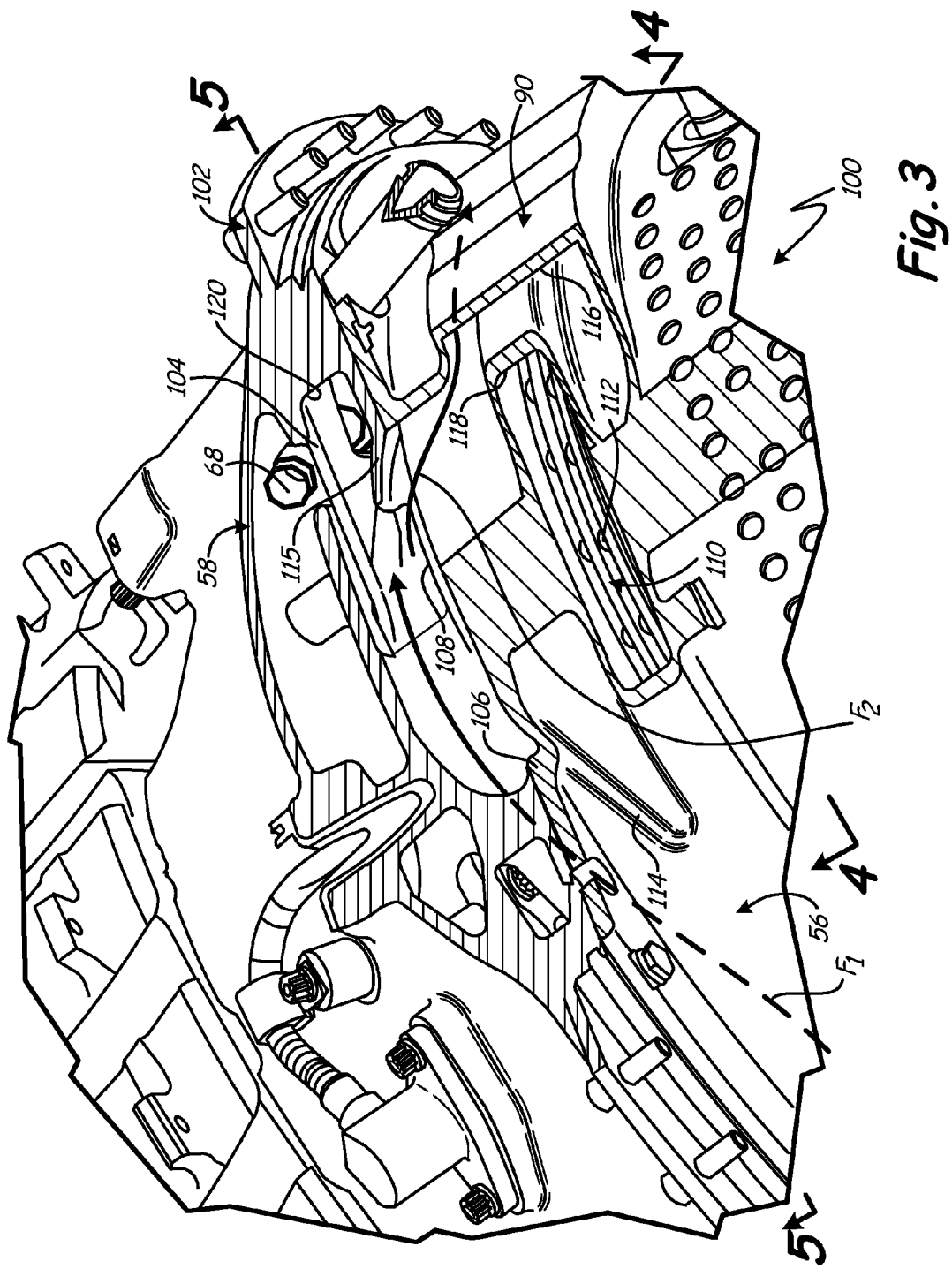
FIG. 3 is a partial perspective view of an oil capture and bypass system with a portion cut away above line 3-3 in FIG. 4.

FIG. 3 is a partial perspective view of oil capture and bypass system 100. In order to show greater detail in FIG. 3, a portion of oil capture and bypass system 100 has been cut away and removed above line 3-3 in FIG. 4. Oil capture and bypass system 100 includes gutter 56, auxiliary reservoir 58, and bypass passage 90. In the illustrated embodiment, auxiliary reservoir 58 is integrally formed with, and exists completely inside, bearing support 102. Bearing support 102 supports No. 1 and No. 1.5 bearings (not shown) of fan shaft 34 (shown in FIG. 1). Bearing support 102 includes sub-supports 104 that are positioned inside auxiliary reservoir 58, without substantially restricting flow within auxiliary reservoir 58. Auxiliary reservoir 58 has reservoir inlet 106 positioned relatively near reservoir outlet 108.

Gutter 56 is positioned radially outward from centerline axis $C_L$ (shown in FIG. 1) and extends circumferentially around fan drive gear system 36 (shown in FIGS. 1 and 2) for capturing lubricating liquid slung from fan drive gear system 36. A portion of gutter 56 is cut away to show flange 110. Flange 110 is connected to ring gear 40 (shown in FIGS. 1 and 2). The lubricating liquid from fan drive gear system 36 is slung through holes 112 in flange 110 into gutter 56. The lubricating liquid then slides around gutter 56 until it gets to gutter exit channel 114. In the illustrated embodiment, gutter exit channel 114 is positioned at an angle of about 30 degrees relative to the direction of flow inside gutter 56 for diverting lubricating liquid to reservoir inlet 106. In an alternative embodiment, gutter exit channel 114 can be positioned at an angle less than or equal to about 60 degrees relative to the direction of flow inside gutter 56. In still other embodiments, gutter exit channel 114 can be positioned at an angle between about 20 degrees and about 90 degrees relative to the direction of flow inside gutter 56.

When auxiliary reservoir 58 is substantially empty, lubricating liquid from gutter 56 fills auxiliary reservoir 58. When auxiliary reservoir 58 is substantially full, excess lubricating liquid hits a "wall" of liquid and is then forced through reservoir outlet 108 into bypass passage 90 with the aid of diverter 115 which acts as a scoop to capture the excess liquid. In the illustrated embodiment, diverter 115 is positioned at about 40 degrees relative to the direction of flow inside bypass passage 90 for diverting lubricating liquid through reservoir outlet 108. In alternative embodiments, diverter 115 can be positioned at an angle between about 20 degrees and about 60 degrees relative to the direction of flow inside bypass passage 90. Flow arrow $F_1$ generally illustrates the direction of flow through reservoir inlet 106. Flow arrow $F_2$ generally illustrates the direction of flow through reservoir outlet 108. Together, gutter 56, auxiliary reservoir 58, and bypass passage 90 combine to define a flow path having turn angles less than or equal to about 40 degrees. In an alternative embodiment, gutter 56, auxiliary reservoir 58, and bypass passage 90 can combine to define a flow path having turn angles less than or equal to about 60 degrees. This relatively streamlined flow path allows capture and bypass system 100 to flow lubricating liquid into and out of auxiliary reservoir 58 while preserving flow energy needed to reach main scavenge passage 86 (shown in FIG. 2). Having sharper angles in the flow path can waste an undesirably large amount of flow energy.

In the illustrated embodiment, gutter 56 and bypass passage 90 are integrally formed and can be cast as a single piece. Exterior wall 118 of gutter 56 is essentially a shared wall between gutter 56 and bypass passage 90. Because the combination of gutter 56 and bypass passage 90 abut directly to auxiliary reservoir 58, the connections can be made without a separate intervening connector pipe and without the losses in flow energy associated therewith. This configuration allows gutter 56 and auxiliary reservoir 58 to be substantially side-by-side.

Figure 4:
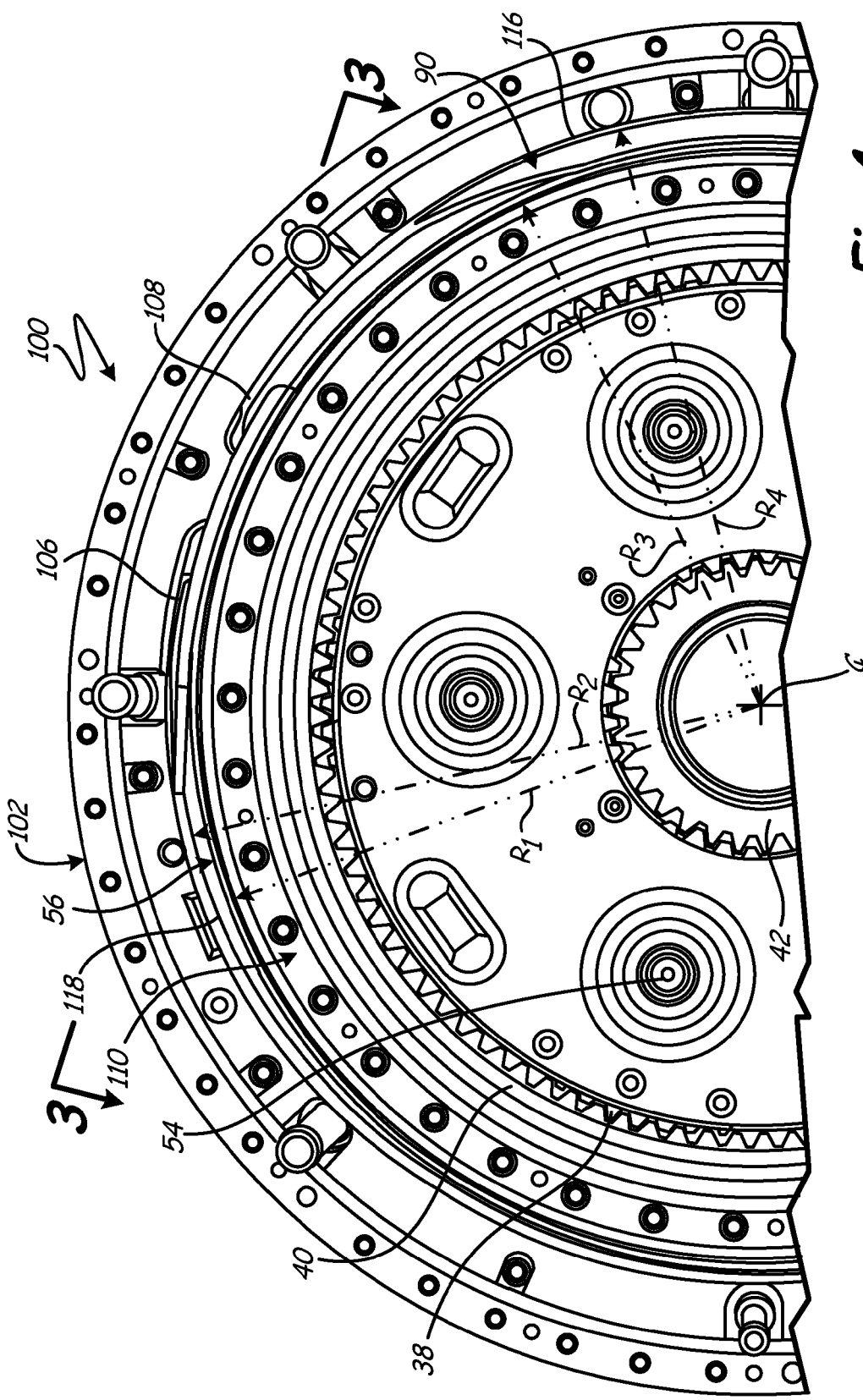
FIG. 4 is a partial sectional elevation view of a portion of the oil capture and bypass system taken along line 4-4 in FIG. 3.

FIG. 4 is a partial sectional elevation view of a portion of oil capture and bypass system 100 taken along line 4-4 in FIG. 3. The view of FIG. 4 is from the aft of gas turbine engine 10 (shown in FIG. 1) looking forward along centerline axis $C_L$. Gutter inner radius $R_1$ extends from centerline axis $C_L$ to an inner diameter of gutter 56. Gutter outer radius $R_2$ extends from centerline axis $C_L$ to exterior wall 118 at an outer diameter of gutter 56. Bypass passage inner radius $R_3$ extends from centerline axis $C_L$ to an inner diameter of bypass passage 90. Bypass passage outer radius $R_4$ extends from centerline axis $C_L$ to exterior wall 116 at an outer diameter of bypass passage 90. In the illustrated embodiment, gutter inner radius $R_1$ is about 10.1 inches (25.654 centimeters). Gutter outer radius $R_2$ is about 10.5 inches (26.67 centimeters). Bypass passage inner radius $R_3$ is about the same as gutter inner radius $R_1$. Bypass passage outer radius $R_4$ is about 11 inches (27.84 centimeters). This allows about a 0.5 inch (1.27 centimeter) gap between exterior wall 116 and exterior wall 118 such that a portion of bypass passage 90 is radially outward from gutter 56 but other portions of bypass passage 90 are on both sides of gutter 56, having the same radial distance from centerline axis $C_L$ as a portion of gutter 56. Auxiliary reservoir 58 (shown in FIG. 3) is obscured in FIG. 4; however, the radius from centerline axis $C_L$ to exterior wall 120 (shown in FIG. 3) of auxiliary reservoir 58 is about the same as $R_2$. This configuration allows oil capture and bypass system 100 to have a relatively small maximum radius. The respective radii of the various elements need not, however, be precisely as illustrated. In alternative embodiments, oil capture and bypass system 100 can be sufficiently compact if at least a portion of auxiliary reservoir 58 and a portion of gutter 56 have the same radial distance from centerline axis $C_L$.

Figure 5:
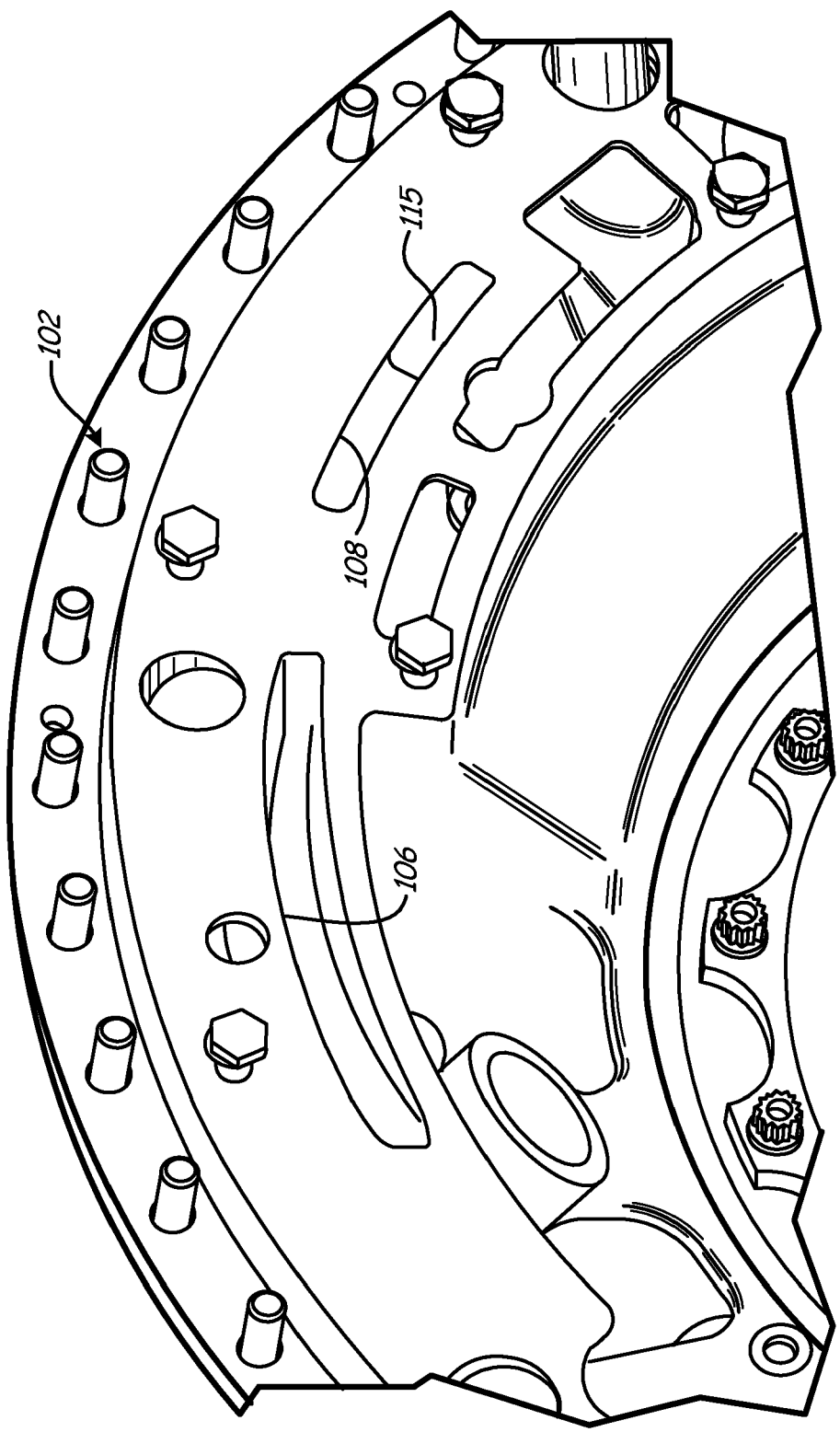
FIG. 5 is a partial perspective view of a portion of the oil capture and bypass system viewed along line 5-5 in FIG. 3.

FIG. 5 is a partial perspective view of a portion of oil capture and bypass system 100 viewed along line 5-5 in FIG. 3. The view of FIG. 5 is from the aft of gas turbine engine 10 (shown in FIG. 1) looking forward. Gutter 56 and bypass passage 90 are not shown in FIG. 5 so as to better illustrate the shape and position of reservoir inlet 106, reservoir outlet 108, and diverter 115.

In summary, it will be recognized that the present invention provides numerous benefits and advantages. The streamlined alignment and configuration of the various components (in particular: reservoir inlet 106, reservoir outlet 108, gutter exit channel 114, and diverter 115) allows for fluid flow into and out of auxiliary reservoir 58 while preserving a relatively large amount of flow energy. Preserving the flow energy allows for placement of auxiliary reservoir 58 radially closer to centerline axis $C_L$ while still having enough flow energy to move the lubricating liquid through bypass passage 90 to main scavenge passage 86. Positioning auxiliary reservoir 58 inside bearing support 102 allows auxiliary reservoir 58 to be relatively near gutter 56 and also at a desirable radius from centerline axis $C_L$. This compact design decreases the amount of space occupied by oil capture and bypass system 100 both radially and axially. This space reduction is important on gas turbine engine 10 for multiple reasons. First, it can allow space for other components necessary for operating gas turbine engine 10. Second, it can allow gas turbine engine 10 to have an air flow path that is larger and/or more aerodynamic.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, reservoir inlet 106, reservoir outlet 108, and diverter 115 can be shaped and oriented differently than illustrated in FIG. 5 so long as the flow path into and out of auxiliary reservoir 58 preserves a sufficient amount of flow energy.

The invention claimed is:

1. An assembly for capturing lubricating liquid from a fan drive gear system of a gas turbine engine, the assembly comprising:
    a gutter extending circumferentially around and positioned radially outward from a centerline axis of the fan drive gear system for capturing lubricating liquid slung from the fan drive gear system; and
    an auxiliary reservoir fluidically connected to the gutter for receiving and storing the lubricating liquid from the gutter, wherein a portion of the auxiliary reservoir and a portion of the gutter that is positioned to face the fan drive gear system for capturing lubricating liquid slung from the fan drive gear system have a same radial distance from the centerline axis of the fan drive gear system.

2. The assembly of claim 1, and further comprising:
    a bypass passage, fluidically connecting the auxiliary reservoir to a main scavenge passage, for discharging excess lubricating liquid from the auxiliary reservoir; and
    a main reservoir fluidically connected to the main scavenge passage.

3. The assembly of claim 2, wherein the gutter and the bypass passage are integrally formed.

4. The assembly of claim 2, wherein the gutter and the bypass passage are cast as a single piece.

5. The assembly of claim 2, wherein the bypass passage is positioned radially outward from the gutter.

6. The assembly of claim 2, wherein the bypass passage shares a wall with the gutter.

7. The assembly of claim 2, wherein the portion of the gutter and a first portion of the bypass passage have a same radial distance from the axis of the fan drive gear system.

8. The assembly of claim 7, wherein a second portion of the bypass passage is positioned radially outward from the portion of the gutter.

9. The assembly of claim 2, and further comprising:
    an auxiliary pump fluidically connected to the auxiliary reservoir for supplying lubricating liquid from the auxiliary reservoir to bearings of the fan drive gear system; and
    a main pump fluidically connected to the main reservoir for supplying lubricating liquid from the auxiliary reservoir to bearings of the fan drive gear system.

10. The assembly of claim 1, wherein the gutter is fluidically connected to the auxiliary reservoir without a separate intervening connector pipe.

11. The assembly of claim 1, wherein the auxiliary reservoir is positioned inside a bearing support structure.

12. The assembly of claim 1, wherein the centerline axis of the fan drive gear system is also a centerline axis of the gas turbine engine.

13. The assembly of claim 1, wherein the gutter, the auxiliary reservoir, and the bypass passage combine to define a flow path having each turn angle less than or equal to 60 degrees.

14. The assembly of claim 1, wherein the gutter, the auxiliary reservoir, and the bypass passage combine to define a flow path having each turn angle less than or equal to 40 degrees.

15. The assembly of claim 1, and further comprising a gutter exit channel angled axially and connecting the gutter to the auxiliary reservoir.

16. An assembly comprising:
   a gas turbine engine having a spool connected to a fan shaft via a gear system;
   a gutter extending circumferentially around the gear system for capturing lubricating liquid slung from the gear system; and
   an auxiliary reservoir fluidically connected to the gutter for receiving and storing the lubricating liquid from the gutter, wherein a portion of the auxiliary reservoir and a portion of the gutter that is positioned to face the gear system for catching lubricating liquid slung from the gear system have the same radial distance from a centerline axis of the gear system.

17. The assembly of claim 16, wherein an outer wall of the auxiliary reservoir has a radial distance from the centerline axis of the gear system that is about equal to or less than a radial distance from an outer wall of the gutter to the centerline axis of the gear system.

18. The assembly of claim 16, and further comprising:
   a bypass passage fluidically connected to the auxiliary reservoir, wherein the gutter, the auxiliary reservoir, and the bypass passage combine to define a flow path having each turn angle less than or equal to 60 degrees.

19. A method for capturing lubricating liquid from a fan drive gear system of a gas turbine engine, the method comprising:
   catching lubricating liquid slung from the fan drive gear system with a gutter spaced circumferentially around the fan drive gear system;
   delivering the lubricating liquid from the gutter to an auxiliary reservoir along a first flow path having each turn angle less than or equal to 60 degrees, wherein a portion of the auxiliary reservoir and a portion of the gutter that is positioned to face the fan drive gear system for capturing lubricating liquid slung from the fan drive gear system have a same radial distance from a centerline axis of the fan drive gear system; and
   delivering excess lubricating liquid from the auxiliary reservoir to a bypass passage along a second flow path having each turn angle less than or equal to 60 degrees.

20. The method of claim 19, wherein the lubricating liquid flows axially forward with respect to a centerline axis of the gas turbine engine when the lubricating liquid is delivered from the gutter to the auxiliary reservoir along the first flow path.

* * * * *